(12) United States Patent
Ishii

(10) Patent No.: US 6,567,985 B1
(45) Date of Patent: May 20, 2003

(54) METHOD, APPARATUS AND MEDIUM FOR IMAGE COMMUNICATION

(75) Inventor: Yoshiki Ishii, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/123,331

(22) Filed: Jul. 28, 1998

(30) Foreign Application Priority Data

Jul. 31, 1997 (JP) .............................................. 9-206093

(51) Int. Cl.[7] ........................ H04N 7/173; H04N 7/14; H04N 7/00; G09G 5/02; G09G 5/00
(52) U.S. Cl. ........................ 725/115; 725/134; 725/90; 725/91; 725/98; 348/22; 348/14.12; 345/698; 345/723
(58) Field of Search ........................ 348/7, 12, 14–20, 348/423, 554, 398.1, 22; 345/1–2, 132, 698, 723; 455/5.1; 725/116, 114, 93, 90, 91–92, 115, 134, 98; 375/240.2; 382/240

(56) References Cited

U.S. PATENT DOCUMENTS

| | | | |
|---|---|---|---|
| 4,549,292 A | * 10/1985 | Isaman et al. .................. 370/89 |
| 4,654,484 A | * 3/1987 | Reiffel et al. .................. 379/53 |
| 5,109,451 A | * 4/1992 | Aono et al. ..................... 382/56 |
| 5,128,776 A | * 7/1992 | Scorse et al. .................. 358/426 |
| 5,150,207 A | * 9/1992 | Someya ........................ 358/133 |
| 5,157,482 A | * 10/1992 | Cosgrove ...................... 348/97 |
| 5,241,382 A | * 8/1993 | Paik et al. .................... 358/133 |
| 5,260,783 A | * 11/1993 | Dixit ............................ 358/136 |
| 5,371,535 A | * 12/1994 | Takizawa ...................... 348/15 |
| 5,426,513 A | * 6/1995 | Scorse et al. .................. 358/433 |
| 5,448,568 A | * 9/1995 | Delpuch et al. ............... 372/94.2 |
| 5,450,411 A | * 9/1995 | Heil ............................ 370/94 |
| 5,539,920 A | * 7/1996 | Menand et al. ................ 455/5.1 |
| 5,548,532 A | * 8/1996 | Menand et al. ................ 364/514 |
| 5,565,922 A | * 10/1996 | Krause ......................... 348/413 |
| 5,684,716 A | * 11/1997 | Freeman ....................... 364/514 |
| 5,687,257 A | * 11/1997 | Paik et al. .................... 382/239 |
| 5,689,562 A | * 11/1997 | Hassan et al. ................. 382/236 |
| 5,691,767 A | * 11/1997 | Tahara ......................... 348/384 |
| 5,818,512 A | * 10/1998 | Fuller .......................... 348/8 |
| 5,892,509 A | * 4/1999 | Jakobs et al. ................. 345/331 |
| 5,896,465 A | * 4/1999 | Copolla ........................ 382/232 |
| 5,912,697 A | * 6/1999 | Hashimoto et al. ............ 348/12 |
| 5,926,205 A | * 7/1999 | Krause et al. ................. 348/7 |
| 5,940,117 A | * 8/1999 | Hassan et al. ................. 348/13 |
| 5,949,551 A | * 9/1999 | Miller et al. .................. 358/408 |
| 5,991,816 A | * 11/1999 | Percival et al. ............... 709/247 |
| 5,996,008 A | * 11/1999 | Gardos et al. ................. 709/219 |
| 6,005,613 A | * 12/1999 | Endsley et al. ................ 348/231 |
| 6,018,816 A | * 1/2000 | Tateyama ..................... 714/746 |
| 6,031,576 A | * 2/2000 | Kuykendall, Jr. .............. 348/426 |
| 6,038,257 A | * 3/2000 | Brusewitz et al. ............. 375/240 |
| 6,078,349 A | * 6/2000 | Molloy ......................... 348/15 |
| 6,108,382 A | * 8/2000 | Gringeri et al. ............... 375/240 |
| 6,211,869 B1 | * 4/2001 | Loveman et al. .............. 345/723 |
| 6,233,393 B1 | * 5/2001 | Yanagihara et al. ........... 386/125 |
| 6,393,152 B2 | * 5/2002 | Takahashi et al. ............. 382/233 |

\* cited by examiner

*Primary Examiner*—John Miller
*Assistant Examiner*—Paulos M. Natnael
(74) *Attorney, Agent, or Firm*—Fitzpatrick, Cella, Harper & Scinto (57) ABSTRACT

An image communication apparatus transmits image data of a plurality of pictures to a receiver side, and transmits the high-resolution information of a picture requested by the receiver side, among the plurality of pictures, in a mode of transmission different from the mode of transmission for the moving image data. The image communication apparatus thus serves two purposes of transmitting a high-resolution still image and transmitting efficiently a moving image.

35 Claims, 7 Drawing Sheets

METHOD, APPARATUS AND MEDIUM FOR IMAGE COMMUNICATION

BACKGROUND OF THE INVENTION

1. Field of the Invention

The present invention relates to a method, apparatus and medium for image communication.

2. Description of the Related Art

With advances in image coding technology, such as JPEG and MPEG, advances, a method for compression coding image data and transmitting it in digital form has been established, and a variety of services including digital TV broadcasting and moving image transmission through the Internet have started. Since a transmission bandwidth is limited in such an image transmission through communication, data, in the form of an image satisfying the needs of a receiver side, is typically transmitted at a minimum definition required. As home computers and high-resolution color printers are widely used, there is a growing need for inputting high-resolution image data into a computer and printing out such an image.

Since moving image transmission such as in TV broadcast service and high-resolution still image transmission are conventionally carried out in separate systems, the image is simply available at a definition designated by the moving image transmission when a desired image frame is picked out from the moving image delivered. Such a definition fails to match the definition of the printout of the high-resolution still image. To this end, a method is contemplated in which the moving image transmission is performed at a standard matching the printout of the high-resolution still image. However, not all services for moving image delivery require the high-resolution standard in the reproducing of a moving image. Since the moving image transmission at the high-resolution standard requires a wider transmission band, there is a difficulty in making the delivery of the moving image, which is typically in need of a multi-channel configuration, compatible with the transmission of the still image at a high definition.

SUMMARY OF THE INVENTION

It is an object of the present invention to perform both the transmission of a high-resolution still image and the high-efficiency transmission of a moving image in a compatible fashion.

It is another object of the present invention to transmit easily a high-resolution still image as necessary.

It is yet another object of the present invention to provide an image communication method and an image communication apparatus, having a novel function, in compliance with the IEEE 1394 Standard.

The image communication method of the present invention achieves the above object in the transmission of image data of a plurality of pictures to a receiver side by transmitting the high-resolution information of pictures requested by the receiver side, among the plurality of pictures, through a method of transmission different from that for the image data.

In the method and medium for image communication of the present invention, isochronous transmission is used to transmit moving image data while asynchronous transmission is used to transmit high-resolution information of a predetermined image frame of the moving image data.

In the image communication method of the present invention, image data of a plurality of pictures is received, a signal that identifies a picture, out of a sequence of pictures received, requiring high-resolution information is transmitted and the high-resolution information that is received in response to the identifying signal is combined with the image data to obtain an image.

It is yet another object of the present invention to provide a method and apparatus for image communication featuring a novel function.

These and other objects and features of the present invention will become apparent from the following description of its preferred embodiments in conjunction with the accompanying drawings.

DESCRIPTION OF THE PREFERRED EMBODIMENTS

Figure 1:
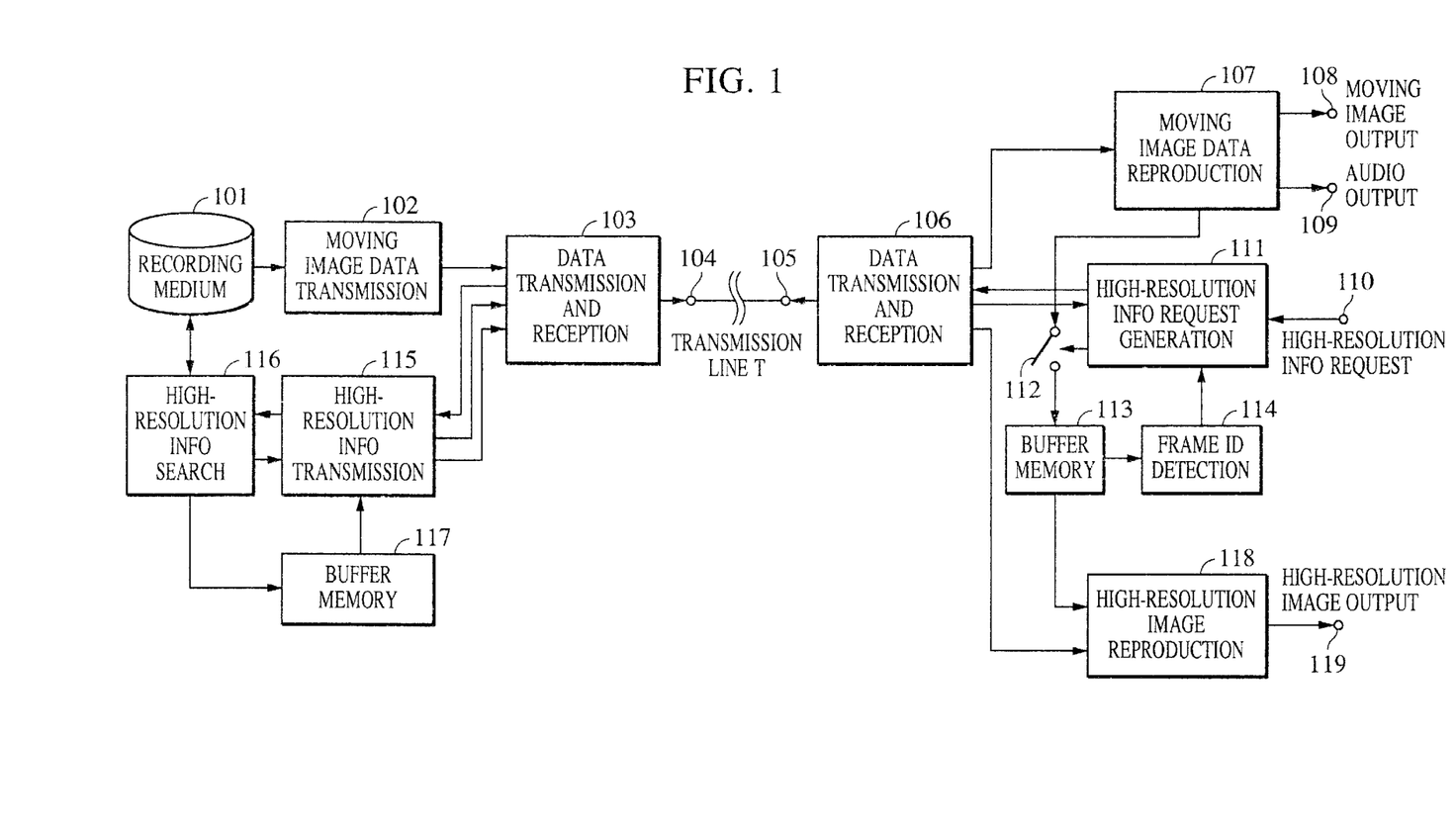
FIG. 1 is a block diagram showing a moving image transmission system that implements the moving image communication method of one embodiment of the present invention.

Referring to the drawings, one embodiment of the present invention is now discussed. FIG. 1 shows one example of moving image transmission system that implements a moving communication method of this embodiment. The transmission of the moving image data is first discussed. The compressed and coded moving image data stored in a recording medium 101 is read from the recording medium by a moving image data transmitter circuit 102, and is fed to a data transceiver circuit 103. The data transceiver circuit 103 packetizes the moving image data, adds a synchronization signal to the data and codes the data for a transmission line, and the resulting moving image data is transmitted over the transmission line from a transmitter side output terminal 104. Depending on the transmission line, the data transmission mode, such as synchronous transmission, isochronous transmission, or asynchronous transmission is determined.

Figure 2A:
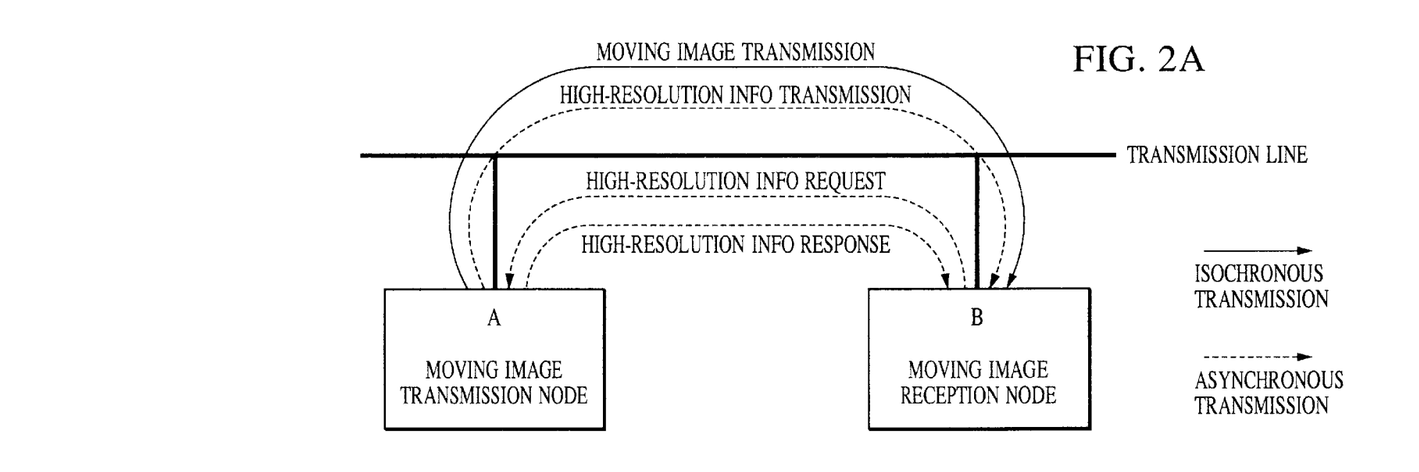
FIGS. 2A and 2B show moving image data/high-resolution information which are transmitted over the transmission line shown in FIG. 1 in an isochronous transmission mode and an asynchronous transmission mode.
Figure 2B:
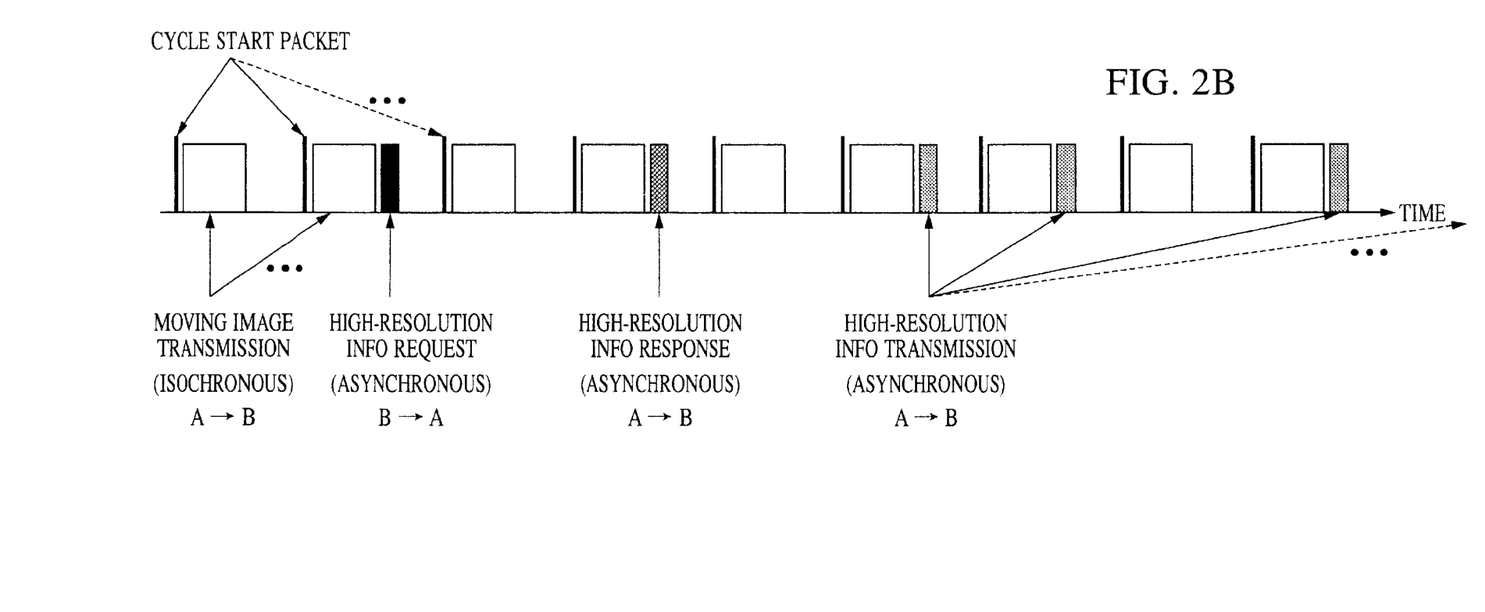

FIGS. 2A and 2B show one example of moving image data transmitted in the isochronous transmission. Referring to FIG. 2A, the moving image data is transmitted through an isochronous channel, assigned to a moving image transmission, from a moving image transmission node A to a moving image reception node B. FIG. 2B shows that the moving image data is transmitted as an isochronous packet in accordance with an isochronous transmission cycle. As shown here, when an isochronous channel is assigned, a transmission band is also assigned so that a predetermined amount of data is transmitted per transmission cycle of a constant period in the isochronous transmission. For this reason, the isochronous transmission is advantageous in the transmission of the moving image, because the moving image is transmitted at the same transmission rate without any interruptions.

The moving image data that is transmitted over a transmission line T as shown in FIG. 1 is input to an input terminal 105 at a receiver side, and a data transceiver circuit 106 decodes the data, which was coded to be compatible with the transmission line, removes the synchronization signal therefrom, and extracts data from the transmitted packet. The resulting moving image data is sent to a moving image reproduction circuit 107. The moving image reproduction circuit 107 splits the moving image data into image and audio signals, and performs an image decompression decoding process and an audio decompression decoding process. The moving image is then output from terminal 108, and the audio signal in synchronization with the moving image is output from a terminal 109.

The high-resolution image reproduction in this embodiment is now discussed. A user request for high-resolution information about a particular image frame, out of images under reproduction, may be input to a terminal 110 when the moving image is reproduced at the receiver side. Such a request input may be a manual input made by the user or an instruction for printout. In response to the request, a high-resolution information request generator circuit 111 performs a process for holding data block required to decode a image frame that was reproduced at the time of the request input, out of the moving image data decoded by the moving image reproduction circuit 107. Specifically, with a write control circuit 112, comprising a switch, turned off, the writing of new moving image data onto a buffer memory 113 is prevented, and the buffer memory 113 holds the data block required for the signal of the image frame prior to the turning off of the write control circuit 112.

When reproduction process in the moving image reproduction circuit 107 takes time, a time delay may take place between the image frame under reproduction and display and the data block that is written from the moving image reproduction circuit 107 to the buffer memory 113. In such a case, the memory capacity of the buffer memory 113 is set to be large enough to absorb the time delay arising from the moving image reproduction circuit 107, and the use of a ring buffer configuration reduces the time delay between the data block that is held in the buffer memory 113 at the time of the request input and the reproduced image at the same moment.

A frame ID detector circuit 114 reads the data block stored in the buffer memory 113, and recognizes a frame ID attached to the image data. The frame ID can be any data as long as it identifies a frame that is reproduced at the time of the request for the high-resolution information, from the frames of the moving images, namely, a requested frame. The frame ID may be a frame number from the start of the moving images, or may be time code data attached to image data.

The high-resolution information request generator circuit 111 notifies the transmitter side of the moving image data of the requested frame by sending a high-resolution information request containing the frame ID over the transmission line T through the data transceiver circuit 106.

FIGS. 2A and 2B illustrate an operation in which the high-resolution information request is transmitted to the transmitter side of the moving image through the asynchronous transmission complying with the IEEE 1394 Standard. Referring to FIG. 2A, the high-resolution information request is transmitted from the moving image reception node B to the moving image transmission node A. Referring to FIG. 2B, the high-resolution information request in an asynchronous packet is transmitted in accordance with an isochronous transmission cycle. Unlike the isochronous transmission, the asynchronous transmission does not assure the time (rate) taken before the end of the transmission. However, the asynchronous transmission mode takes advantage of unused time of the isochronous transmission cycle, thereby leaving the bandwidth of the isochronous transmission intact. The asynchronous transmission is thus useful for sending a data packet, such as a high-resolution request, which is not regular in nature.

The data transceiver circuit 103 on the moving image transmitter side in FIG. 1 outputs the received high-resolution information request to a high-resolution information transmitter circuit 115. The high-resolution information transmitter circuit 115 notifies a high-resolution information search circuit 116 of the frame ID, instructing it to search for the high-resolution information of the corresponding image frame.

The high-resolution information search circuit 116 searches in the recording medium 101 for the frame ID, reads the high-resolution information of the image frame corresponding to the frame ID, and stores it in a memory buffer 117. The high-resolution information search circuit 116 notifies the high-resolution information transmitter circuit 115 of a search result, indicative of a success or failure, which will be used in a subsequent alternative process performed in case of an aborted search. When information about the number of frames before the target frame from the head frame of the moving image is available as the frame ID, the searching for the target frame according to the frame ID may be performed by counting the frames from the head frame to the frame designated by the frame ID in connection with image information including the high-resolution information stored in the recording medium 101. A faster search is possible by recording a search information corresponding to the frame ID to each frame when the high-resolution information is recorded onto the recording medium 101 or by recording index information indicating where the high-resolution information of the frame corresponding to the frame ID is present when the high-resolution information is recorded onto the recording medium 101. For example, time code information which is used in video signals complying with studio broadcast and other standards is attached to the high-resolution information on a frame by frame basis, wherein the time code is set to be in agreement with the time code information contained in the moving image data to be transmitted. The search is made by referring to the time code information as the frame ID.

The high-resolution information transmitter circuit 115 transmits the search result indicative of a success or failure as high-resolution information response to the receiver side through the data transceiver circuit 103. When the search is successful, the high-resolution information stored in the memory buffer 117 is transmitted to the receiver side through the data transceiver circuit 103.

As shown in FIGS. 2A and 2B, the high-resolution information response and the high-resolution information is transmitted in the asynchronous transmission mode. Referring to FIG. 2A, the high-resolution information response indicative of a successful search is transmitted from the moving image transmission node A to the moving image reception node B, and the high-resolution information is divided into a plurality of synchronous packets, the number of which depends on the amount of information. Referring to FIG. 2B, the high-resolution information response and the high-resolution information are transmitted in asynchronous packets in accordance with the asynchronous transmission cycle. Like the moving image data, the high-resolution information may be transmitted in the isochronous transmission mode. Since urgency, which is required of the moving image, is not required of the high-resolution still image in most of its applications, the transmission of a plurality of divided packets using the asynchronous transmission mode serves more the effective use of the bandwidth of the transmission line.

The high-resolution information thus transmitted is received by the data transceiver circuit 106 and is fet to a high-resolution image reproducing circuit 118 in the receiver side shown in FIG. 1. The high-resolution image reproducing circuit 118 reads the moving image data block held in the buffer memory 113 and decompresses and decodes it along with the received high-resolution information to reproduce an image frame higher in definition than the moving image output at a moving image output terminal 108, and outputs it to a terminal 119.

In the above discussion of the transmission medium shown in FIG. 2, the two transmission modes, namely, the isochronous transmission and the asynchronous transmission are available. The transmission of the moving image data and the high-resolution information may be performed in other transmission modes. The moving image data and the high-resolution information may be transmitted through different transmission media.

Figure 3A:
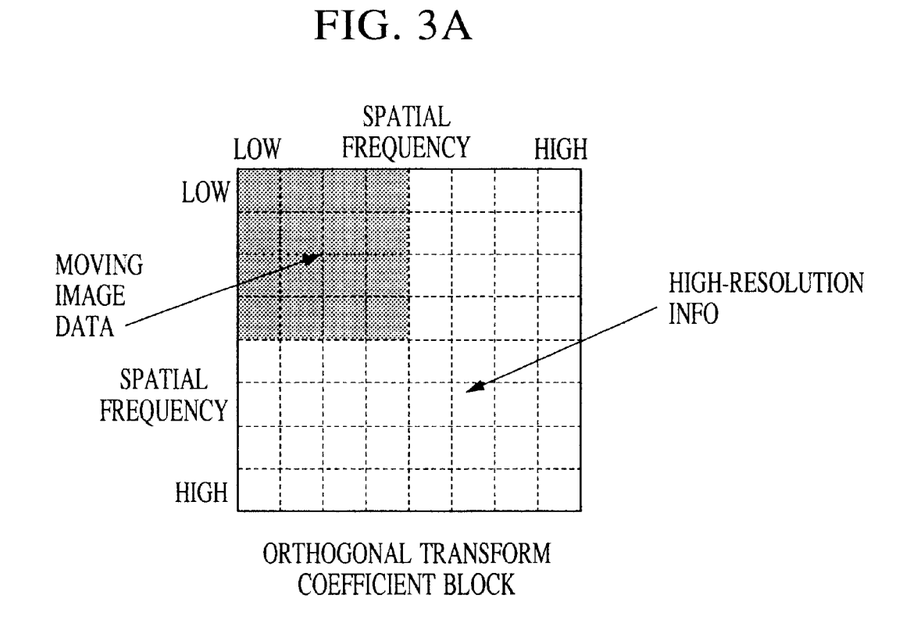
FIGS. 3A and 3B show how the moving image data and high-resolution information are generated through orthogonal transform coding method.
Figure 3B:
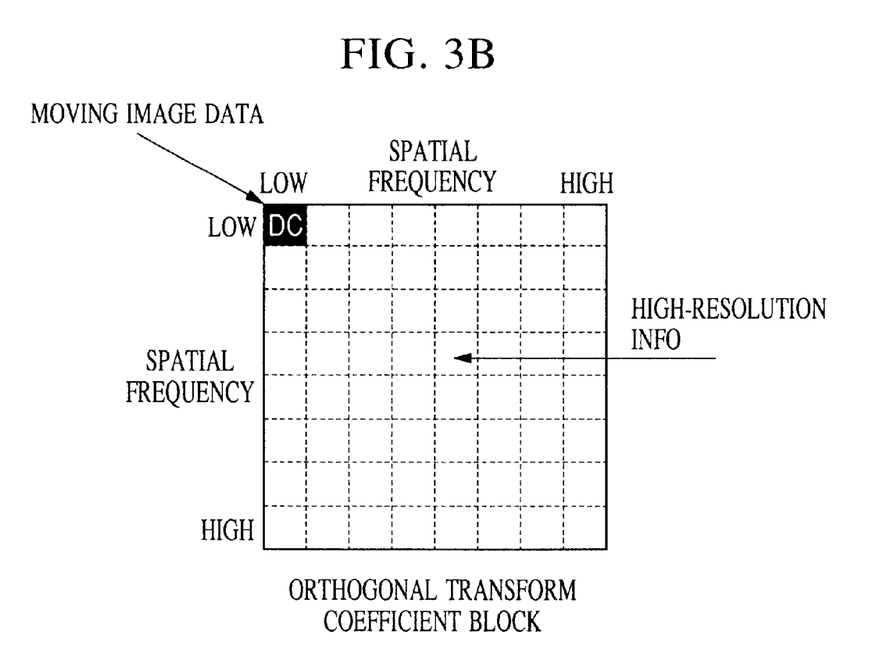

The organization of the basic moving image data and the corresponding high-resolution information handled in this embodiment is now discussed referring FIGS. 3A and 3B.

FIGS. 3A and 3B show the organization of the moving image data and its corresponding high-resolution information in the orthogonal transform coding system used in MPEG-1 and JPEG. Referring to FIG. 3A, the moving image data is organized through compression and coding, using orthogonal transform coefficient data corresponding to low spatial frequency components, out of orthogonal transform coefficients, and the high-resolution information is organized through compression and coding using the remaining coefficient data. Available for the reproduction of the moving image in the receiver side are one method in which an inverse orthogonal transform is performed to reproduce a moving image with the coefficients of high spatial frequency components not transmitted treated as zeros, and another method in which an inverse orthogonal transform is performed to a small block size containing transmitted coefficient data only to reproduce a moving image at the reduced size. FIG. 3B shows an example of data organization in which the moving image data is limited. As the moving image data, a DC (direct current) coefficient only, corresponding to an intra-block average, is transmitted while the remaining coefficients are transmitted in the high-resolution information.

Figure 4:
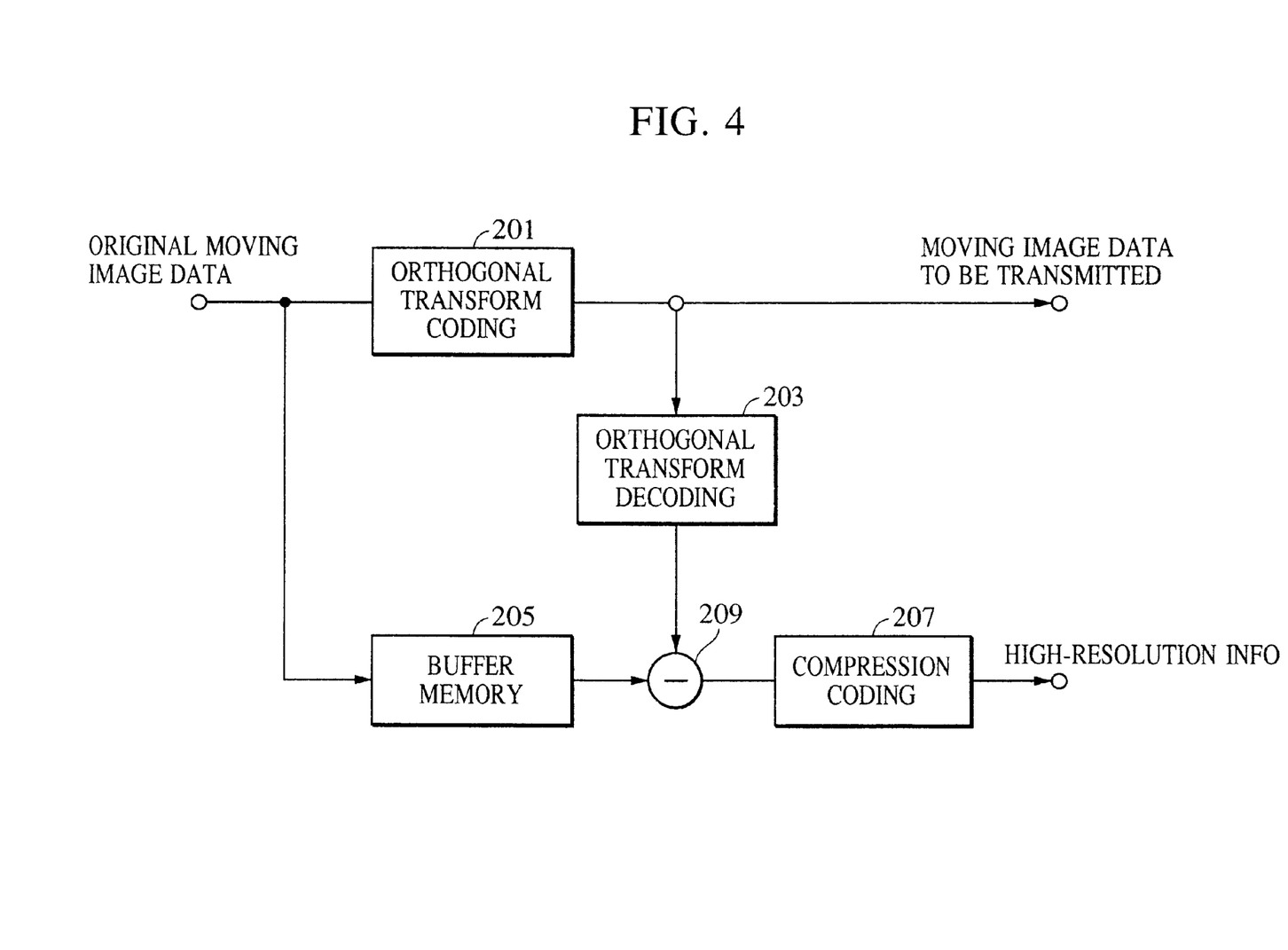
FIG. 4 is a block diagram showing how the high-resolution information in the form of differential data between partially decoded, orthogonal transform coded data and an original image is organized.

It is a standard practice in the coding in the spatial frequency domain, such as the orthogonal transform coding, to concentrate information missing due to non-decompressible compression process in high frequency components and to turn a degradation in a reproduced image into a reduction in high-resolution components. In such a coding, the differential data between a partially decoded image from the coded image and an original image corresponds to a high-resolution component that is missing in the course of the coding. The differential data that is compressed and coded may be transmitted as the high-resolution information in the moving image transmission method of the present invention as shown in FIG. 4. In a moving image coding method, intra-frame coded data subjected to decimation for a predetermined duration and motion information are sent while frames not transmitted are reproduced based on motion compensative prediction in the receiver side. In such a method, the transmitter side compresses and codes motion compensative prediction error data, which is a differential between the motion compensative prediction and the original image, and treats the error data as the high-resolution information.

Referring to FIG. 4, there are shown an orthogonal transform coding circuit 201 for performing the orthogonal transform coding, an orthogonal transform decoding circuit 203 for decoding the data coded by the orthogonal transform coding circuit 201, a buffer memory 205 for delaying the input moving image data by a duration equal to the time both the orthogonal transform coding circuit 201 and orthogonal transform decoding circuit 203 takes for coding and decoding processes, a differential unit 209 for determining a differential value between the outputs of the orthogonal transform decoding circuit 203 and buffer memory 205, and a compression coding circuit 207 for compressing and coding the output of the differential unit 209.

Figure 5:
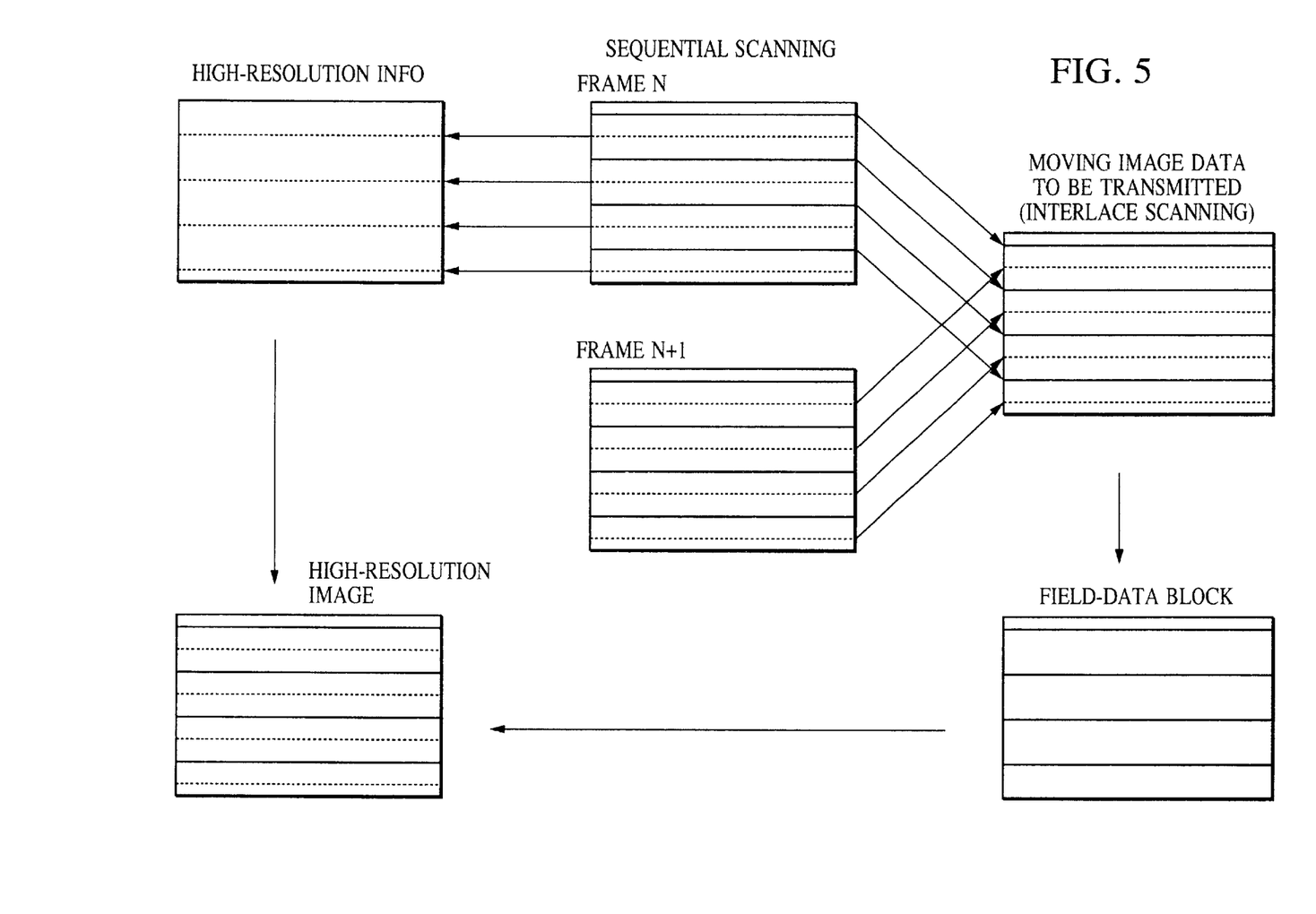
FIG. 5 is a diagram in which the moving image data is organized from a sequentially scanned moving image through interlace scanning, and in which the high-resolution information is organized from the scan lines of a reverse field.

The organization of the high-resolution information is now discussed referring to FIG. 5.

FIG. 5 shows a system in which a sequentially scanned moving image from an original signal is converted into an interlaced scanned one to generate moving image data to be transmitted. The high-resolution information is organized from the scan lines of a reverse field that was unused in the interlaced scanning conversion process. The interlaced scanning is often employed in the transmission of the moving image because it offers smooth motion and requires the amount of information smaller than the sequential scanning. However, the interlaced scanning is composed of a single frame which is constructed of two fields, the scanning lines of which suffer a time difference therebetween. To obtain a blur-free still image in a moving display, one field data only can be used, halving the vertical definition of the image. In this case, the high-resolution information is organized from the scan lines of the reverse field that was unused in the course of conversion to the interlaced scanning, and is transmitted using the moving image communication method of this embodiment. A high-resolution still image is thus obtained.

Figure 6:
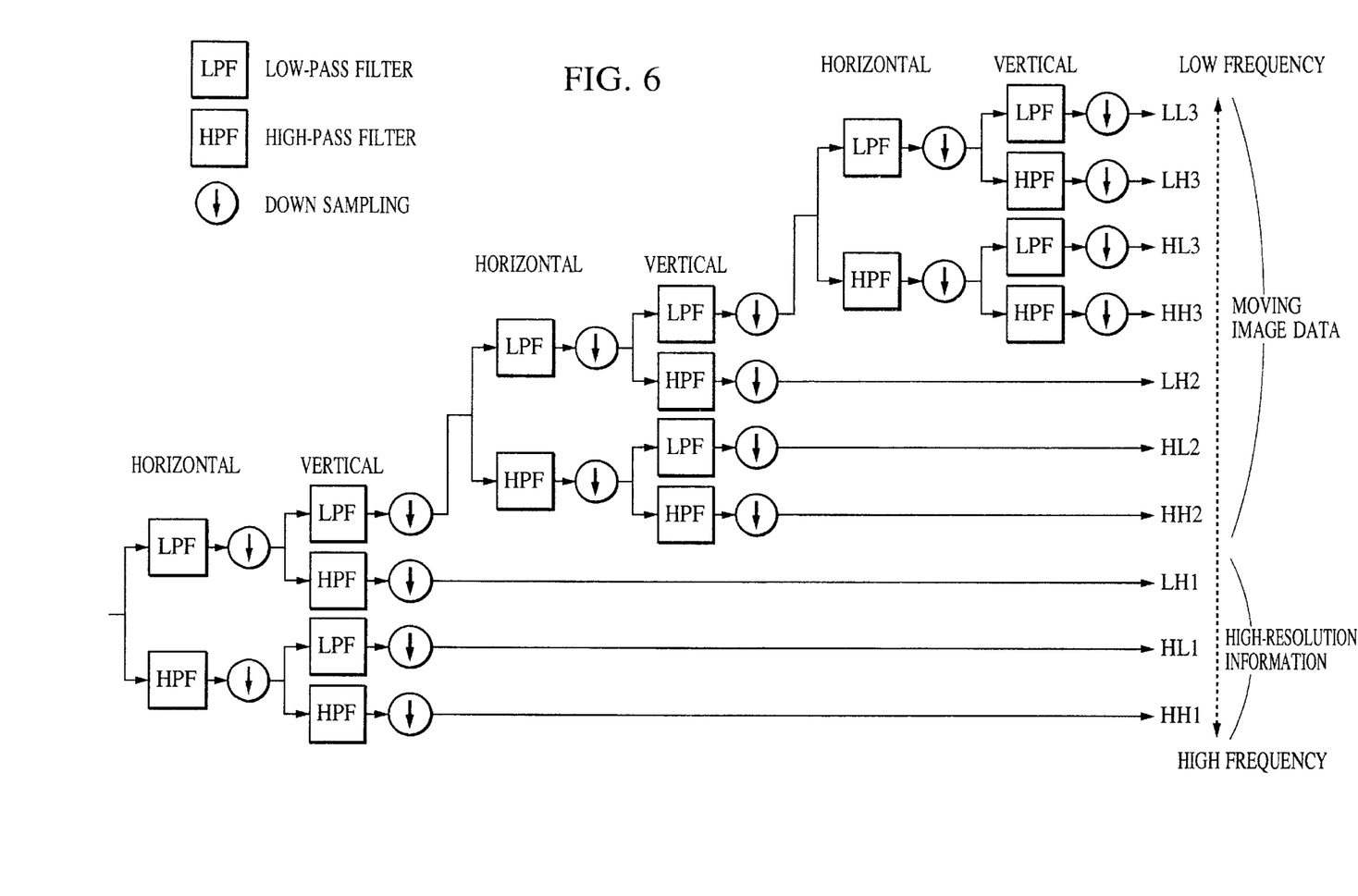
FIG. 6 is a diagram in which the moving image data and high-resolution information are organized through compression coding method which compresses data after dividing data into a plurality of spatial frequency bands using spatial filters.

Referring to FIG. 6, another organization of the high-resolution information is discussed.

FIG. 6 shows a two-dimensional wavelet transform. The two-dimensional wavelet transform is one of frequency bandwidth division methods which are used in a coding process that compresses data after dividing the data into predetermined spatial bandwidths using a spatial filter bank for dividing image data into predetermined spatial frequency components. In the two-dimensional wavelet transform as shown, blocks of LPFs (low-pass filters), HPFs (high-pass filters) and downward pointing arrows in circles perform horizontal/vertical low-pass filtering, high-pass filtering and down sampling, thereby performing two-dimensional hierarchical frequency bandwidth division. Low-frequency data only, out of the bandwidth divided data, is used in the compression and coding process to generate a moving image, and the remaining high-frequency data is compressed and coded to generate the high-resolution information. The basic moving image data in this embodiment and the high-resolution information are thus organized.

As have been discussed with reference to FIG. 4, FIG. 5 and FIG. 6, the moving image data and the high-resolution information are recorded onto the recording medium 101 as shown in FIG. 1. Two recording methods are contemplated: in one method, the moving image data and the high-resolution information are separately recorded, and in the other method, the moving image data and the high-resolution information are recorded as high-resolution moving image data in an integrated form. Since the separate recording method permits the moving image and the high-resolution information to be recorded in their respective appropriate forms, the process of transmission/search is easily performed. In the integrated recording method, the moving image data and audio data except the high-resolution information are extracted and then transmitted during a moving data transmission process, and the high-resolution information, not transmitted as the moving image data, is extracted and then transmitted during a high-resolution information transmission process. Although the data extraction process is additionally required, the integrated recorded high-resolution moving image data is sent, as is, over a transmission line having a wide band. The integrated recording method is advantageous when both the moving image transmission possible over a narrow transmission band of this embodiment and the high-resolution moving image transmission using a conventional wide band transmission line are operated in parallel.

As shown in FIG. 1, both the moving image data and the high-resolution information are read from the same recording medium 101. In the separate recording method, the moving image data and the high-resolution information may be recorded in separate recording media.

Figure 7:
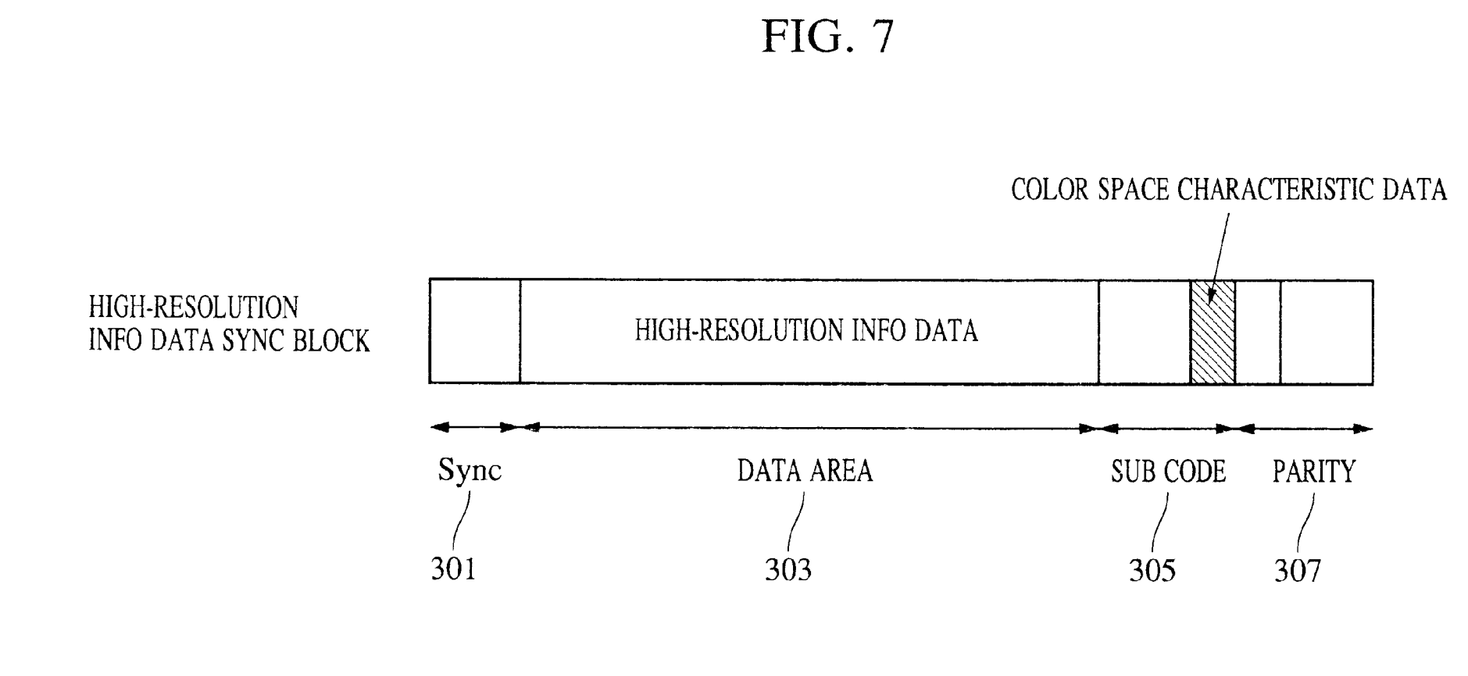
FIG. 7 is a diagram in which color space characteristic data at a picture taking, as additional information, is added to the high-resolution information.

In the present invention, the additional information, which is not vital in the normal reproduction of the moving image, is necessary in the high-resolution image reproduction. In one feature of the present invention, the target high-resolution image frame is appropriately processed without the need for increasing the transmission rate of the moving data when the additional information is transmitted together with the high-resolution information. Referring to FIG. 7, color space characteristics data at a picture taking as the additional information is attached to the high-resolution information. The color space characteristics data may include color adjustment information, input profile data for a color matching system or the like at the picture taking. When the high-resolution image frame is reproduced from the basic moving data transmitted in advance and the high-resolution information, an appropriate color reproduction is possible using these data. In this case, no increase in the amount of information results in the reproduction of the moving image. FIG. 7 shows high-resolution information data synchronization blocks 301 through 307. The block 301 contains a synchronization signal, the block 303 contains the high-resolution information, the block 305 contains the above-described additional information, and the block 307 contains a parity bit for error-correcting all data synchronization blocks.

According to the moving image communication method of this invention, the basic moving image data is transmitted through the predetermined means while the frame high-resolution information about an image frame requested by the receiver side, out of a sequence of consecutive image frames, is transmitted in a transmission mode different from that for the moving image data. Based on the data required to reproduce the image frame out of the moving image data and the frame high-resolution information, an image frame is reproduced in a definition higher than the definition at which the image frames are reproduced based on the moving image data only. The high-resolution still image data is obtained for the image frame requested by the receiver side, without the need for widening the transmission band for the moving image for the reproduction of the high-resolution still image. Since the high-resolution information only, which was not transmitted as the moving image, is transmitted for a high-resolution still image in addition to the basic moving image, the transmission of the high-resolution still image is performed at a narrow transmission band, compared with the ordinary transmission of the still image. Both the transmission of the moving image using the narrow transmission band and the transmission of the high-resolution still image of a frame selected from the moving image are performed in a compatible manner.

This embodiment has been discussed in connection with the communication mode complying with the IEEE 1394 Standard. The present invention is not limited to this communication mode. The present invention may be also implemented in a case where moving image data is transmitted over the Internet. A variety of coding methods other than the ones described above may be employed.

The present invention may be implemented in a system constructed a plurality of apparatuses (including a host computer, interface units, a reader and a printer) or may be implemented in a standalone apparatus (such as a photo-copying machine or a facsimile machine).

A program code of software for carrying out the functions of the embodiment is loaded in a computer in a system or apparatus connected to a variety of devices so that the devices perform the functions of the above embodiment. The variety of devices operate according to the program code stored in the computer (CPU or MPU) in the system or apparatus. Such embodiments fall within the scope of the present invention.

The program code of software performs the functions of the embodiment. The program code itself, and means for feeding the program code to the computer, for example, a storage medium for storing the program code, fall within the scope of the present invention.

Available as storage media for feeding the program code are a floppy disk, a hard disk, an optical disk, a magneto-optic disk, a CD-ROM, a magnetic tape, a non-volatile memory card, ROM and the like.

By executing the program code read by the computer, the functions of the embodiments are performed. Furthermore, the OS (operating system) running on the computer performs partly or entirely an actual process according to the instruction of the program code, and the functions of the embodiments are thus performed. Such a program code falls within the scope of the present invention.

The program code from the storage medium is read into a memory incorporated in a feature expansion board in the computer or in a feature expansion unit connected to the computer. The CPU mounted on the feature expansion board or the feature expansion unit performs partly or entirely the actual process in response to the instruction from the program code. The functions of the above embodiment are executed through the process. Such a program code falls within the scope of the present invention.

The present invention thus permits the transmission of the high-resolution image while transmitting the moving image at a high efficiency.

What is claimed is:

1. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein the request for the high-resolution information from the receiver side is placed during transmission of the plurality of pictures, and
   wherein the receiver side places the request for the high-resolution information while holding data of the picture for which high-resolution information has been requested, out of moving image data that was received, at least until reception of the requested high-resolution information is completed.

2. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein the moving image data of the plurality of pictures is transmitted with audio data attached thereto, and
   wherein the high-resolution information does not include the audio data.

3. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein the high-resolution information is transmitted with additional information, attached thereto, other than the image data, and
   wherein the additional information is effective in reproduction of a high-resolution image of the picture but is not needed in reproduction of the moving image data of the plurality of pictures alone.

4. An image communication method according to claim 3, wherein the high-resolution information is transmitted with color space characteristics information of the picture attached thereto.

5. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein a transmission rate of the different mode of transmission is lower than a transmission rate for the moving image data of the plurality of pictures.

6. An image communication method according to claim 5, wherein the frame ID is a frame number.

7. An image communication method according to claim 5, wherein the frame ID comprises time code data.

8. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein the moving image data of the plurality of pictures is transmitted in an isochronous transmission complying with an IEEE 1394 Standard while the high-resolution information is transmitted in an asynchronous transmission complying with the IEEE 1394 Standard.

9. An image communication method comprising the steps of:
   sequentially transmitting moving image data of a plurality of pictures to a receiver side, each picture being identified by a frame ID; and
   transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
   wherein the moving image data of the plurality of pictures is transmitted in an isochronous transmission, and wherein the high-resolution information is transmitted through an isochronous transmission channel different from a channel used for the moving image data.

10. An image communication method comprising the steps of:
    sequentially transmitting moving image data of a plurality of pictures to a receiver side, each picture being identified by a frame ID; and
    transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
    wherein the high-resolution information is a high-frequency component in an orthogonal transform coding of the moving image data.

11. An image communication method according to claim 10, wherein the moving image data of the plurality of pictures includes a direct-current component in the orthogonal transform coding of the moving image data.

12. An image communication method comprising the steps of:
sequentially transmitting moving image data of a plurality of pictures to a receiver side; and
transmitting high-resolution information of a picture requested by the receiver side, among the plurality of pictures, in a mode of transmission different from a mode of transmission for the moving image data,
wherein the high-resolution information is produced from a differential between a partially decoded image of the moving image data of the plurality of pictures and an original image.

13. An image communication method comprising the steps of:
sequentially transmitting moving image data of a plurality of pictures to a receiver side, each picture being identified by a frame ID; and
transmitting high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
wherein the moving image data of the plurality of pictures is an interlaced scanned image that is obtained by decimating a sequentially scanned image in time, and wherein the high-resolution information is obtained from scanned data that was decimated during interlacing and complements the interlaced scanned image.

14. An image communication method comprising the steps of:
sequentially transmitting moving image data of a plurality of pictures to a receiver side; and
transmitting high-resolution information of a picture requested by the receiver side, among the plurality of pictures, in a mode of transmission different from a mode of transmission for the moving image data,
wherein the high-resolution information is produced from high-frequency band component data that is obtained through a compression and coding process in succession to a division process in which a spatial filter bank divides the moving image data into data in a predetermined spatial frequency band.

15. An image communication method comprising the steps of:
receiving moving image data of a plurality of pictures, each picture being identified by a frame ID;
transmitting, to a receiver side, an identifying signal including the frame ID that identifies a picture, out of a sequence of pictures received, requiring high-resolution information; and
combining high-resolution information that is received in response to the identifying signal with already received image data of a picture among the plurality of pictures to obtain a high-resolution image,
wherein a communication method for transmitting the moving image data of the plurality of pictures and a communication method for transmitting the identifying signal are different from each other.

16. An image communication method according to claim 15, wherein communication is performed in compliance with an IEEE 1394 Standard.

17. An image communication apparatus comprising:
a first transmission unit adapted to sequentially transmit moving image data of a plurality of pictures to a receiver side, each picture being identified by a frame ID; and
a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
wherein a request for the high-resolution information from the receiver side is placed during transmission of the plurality of pictures, and
wherein the receiver side places the request for the high-resolution information while holding data of the picture for which the high-resolution information has been requested, out of moving image data that was received, at least until reception of the requested high-resolution information is completed.

18. An image communication apparatus comprising:
a first transmission unit adapted to sequentially transmit moving image data of a plurality of pictures to a receiver side, each picture being identified by a frame ID; and
a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
wherein the moving image data of the plurality of pictures is transmitted with audio data attached thereto, and
wherein the high-resolution information does not include the audio data.

19. An image communication apparatus comprising:
a first transmission unit adapted to sequentially transmit moving image data of a plurality of pictures to a receiver side, each picture being identified by a frame ID; and
a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture,
wherein the high-resolution information is transmitted with additional information, attached thereto, other than the image data, and
wherein the additional information is effective in reproduction of a high-resolution image of the picture but is not needed in reproduction of the moving image data of the plurality of pictures alone.

20. An image communication apparatus comprising:
a first transmission unit adapted to sequentially transmit moving image data of a plurality of pictures to a receiver side, each picture being identified by a frame ID; and
a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture, wherein a transmission rate of the different mode of transmission is lower than a transmission rate for the moving image data of the plurality of pictures.

21. An image communication apparatus comprising:

a first transmission unit adapted to sequentially transmit moving image data of a plurality of pictures to a receiver side, each picture being identified by a frame ID; and a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture, wherein the moving image data of the plurality of pictures is transmitted in an isochronous transmission complying with an IEEE 1394 Standard while the high-resolution information is transmitted in an asynchronous transmission complying with the IEEE 1394 Standard.

22. An image communication apparatus comprising:

a first transmission unit adapted to sequentially transmit moving image data of a plurality of pictures to a receiver side, each picture being identified by a frame ID; and a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture, wherein the moving image data of the plurality of pictures is transmitted in an isochronous transmission, and wherein the high-resolution information is transmitted through an isochronous transmission channel different from a channel used for the moving image data.

23. An image communication apparatus comprising:

a first transmission unit adapted to sequentially transmit moving image data of a plurality of pictures to a receiver side, each picture being identified by a frame ID; and a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture, wherein the high-resolution information is a high-frequency component in an orthogonal transform coding of the moving image data.

24. An image communication apparatus comprising:

a first transmission unit adapted to sequentially transmit moving image data of a plurality of pictures to a receiver side; and a second transmission unit adapted to transmit high-resolution information of a picture requested by the receiver side, among the plurality of pictures, in a mode of transmission different from a mode of transmission for the moving image data, wherein the high-resolution information is produced from a differential between a partially decoded image of the moving image data of the plurality of pictures and an original image.

25. An image communication apparatus comprising:

a first transmission unit adapted to sequentially transmit moving image data of a plurality of pictures to a receiver side, each picture being identified by a frame ID; and a second transmission unit adapted to transmit high-resolution information of a picture requested by the receiver side, among the plurality of pictures, in a mode of transmission different from a mode of transmission for the moving image data, wherein the receiver side requests the picture among the plurality of pictures by specifying the frame ID identifying the picture, wherein the moving image data of the plurality of pictures is an interlaced scanned image that is obtained by decimating a sequentially scanned image in time, and wherein the high-resolution information is obtained from scanned data that was decimated during interlacing and complements the interlaced scanned image.

26. An image communication apparatus comprising:

a first transmission unit adapted to sequentially transmit moving image data of a plurality of pictures to a receiver side; and a second transmission unit adapted to transmit high-resolution information of a picture requested by the receiver side, among the plurality of pictures, in a mode of transmission different from a mode of transmission for the moving image data, wherein the high-resolution information is produced from high-frequency band component data that is obtained through a compression and coding process in succession to a division process in which a spatial filter bank divides the moving image data into data in a predetermined spatial frequency band.

27. An image communication apparatus comprising:

a reception unit adapted to receive moving image data of a plurality of pictures, each picture being identified by a frame ID;

a transmission unit adapted to transmit, to a receiver side, an identifying signal including the frame ID that identifies a picture, out of a sequence of pictures received, requiring high-resolution information; and a combination unit adapted to combine high-resolution information that is received in response to the identifying signal with already received image data of a picture among the plurality of pictures to obtain a high-resolution image, wherein a communication method for transmitting the moving image data of the plurality of pictures and a communication method for transmitting the identifying signal are different from each other.

28. An image communication method comprising the steps of:

sequentially transmitting moving image data of a plurality of frames to a receiver side in an isochronous transmission mode, each frame being identified by a frame ID;

requesting high-resolution information of a frame by sending, to a transmitter side, a high-resolution information request containing the frame ID of the frame, among the plurality of frames, for which high-resolution information is requested; and transmitting the high-resolution information in an asynchronous transmission mode.

29. An image communication method comprising the steps of:
- sequentially transmitting moving image data of a plurality of frames to a receiver side through an isochronous transmission channel, each frame being identified by a frame ID;
- requesting high-resolution information of a frame by sending, to a transmitter side, a high-resolution information request containing the frame ID of the frame, among the plurality of frames, for which high-resolution information is requested; and
- transmitting the high-resolution information through an isochronous transmission channel different from a channel used for the moving image data.

30. An image communication method comprising the steps of:
- sequentially transmitting moving image data of a plurality of frames to a receiver side, each frame being identified by a frame ID;
- requesting high-resolution information of a frame by sending, to a transmitter side, a high-resolution information request containing the frame ID of the frame, among the plurality of frames, for which high-resolution information is requested; and
- transmitting the high-resolution information in a mode of transmission different from a mode of transmission for the moving image data,
- wherein a transmission rate of the different mode of transmission is lower than a transmission rate for the moving image data of the plurality of frames.

31. An image communication method according to claim 30, wherein the receiver side places the request for the high-resolution information while holding image data of the frame for which high-resolution information has been requested, at least until reception of the requested high-resolution information is completed.

32. An image communication apparatus comprising:
- a first transmission unit adapted to sequentially transmit moving image data of a plurality of frames to a receiver side, each frame being identified by a frame ID;
- a high-resolution request generator adapted to request high-resolution information of a frame by sending, to a transmitter side, a high-resolution information request containing the frame ID of the frame, among the plurality of frames, for which high-resolution information is requested; and
- a second transmission unit adapted to transmit high-resolution information of a frame requested by said high-resolution request generator in a mode of transmission different from a mode of transmission for the moving image data, wherein said high-resolution request generator requests the frame among the plurality of frames by specifying the frame ID identifying the frame,
- wherein a transmission rate of the different mode of transmission is lower than a transmission rate for the moving image data of the plurality of frames.

33. An image communication apparatus according to claim 32, wherein said high-resolution request generator places the request for the high-resolution information while the receiver side holds image data of the frame for which high-resolution information has been requested, at least until reception of the requested high-resolution information is completed.

34. An image communication apparatus comprising:
- a first transmission unit adapted to sequentially transmit moving image data of a plurality of frames to a receiver side in an isochronous transmission mode, each frame being identified by a frame ID;
- a high-resolution request generator adapted to request high-resolution information of a frame by sending, to a transmitter side, a high-resolution information request containing the frame ID of the frame, among the plurality of frames, for which high-resolution information is requested; and
- a second transmission unit adapted to transmit high-resolution information of a frame requested by said high-resolution request generator in an asynchronous transmission mode, wherein said high-resolution request generator requests the frame among the plurality of frames by specifying the frame ID identifying the frame.

35. An image communication apparatus comprising:
- a first transmission unit adapted to sequentially transmit moving image data of a plurality of frames to a receiver side through an isochronous transmission channel, each frame being identified by a frame ID;
- a high-resolution request generator adapted to request high-resolution information of a frame by sending, to a transmitter side, a high-resolution information request containing the frame ID of the frame, among the plurality of frames, for which high-resolution information is requested; and
- a second transmission unit adapted to transmit high-resolution information of a frame requested by said high-resolution request generator through an isochronous transmission channel different from a channel used for the moving image data, wherein said high-resolution request generator requests the frame among the plurality of frames by specifying the frame ID identifying the frame.

* * * * *